May 22, 1962
O. D. SCARBOROUGH
3,035,830
MACHINE FOR MILLING AND REMOVING INHIBITORS
FROM PROPELLANT GRAIN
Filed June 18, 1954
2 Sheets-Sheet 1
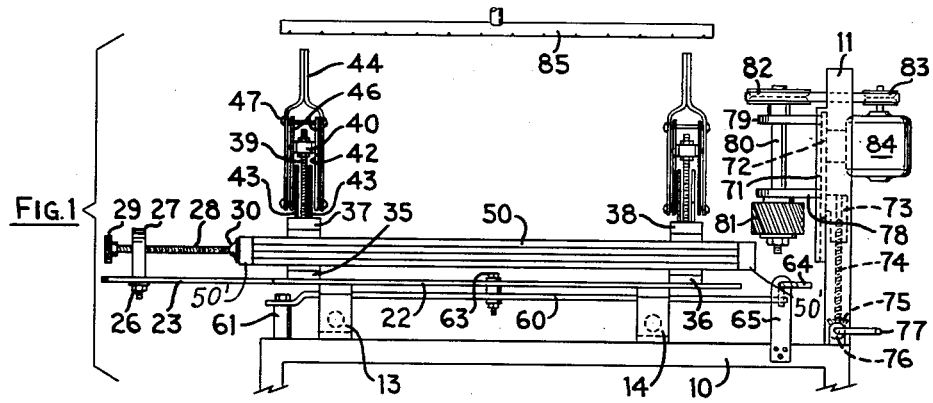
FIG. 1
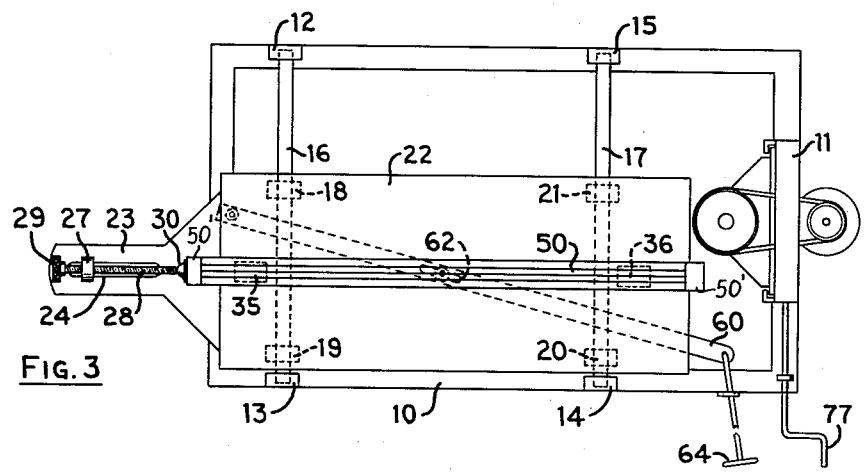
FIG. 3
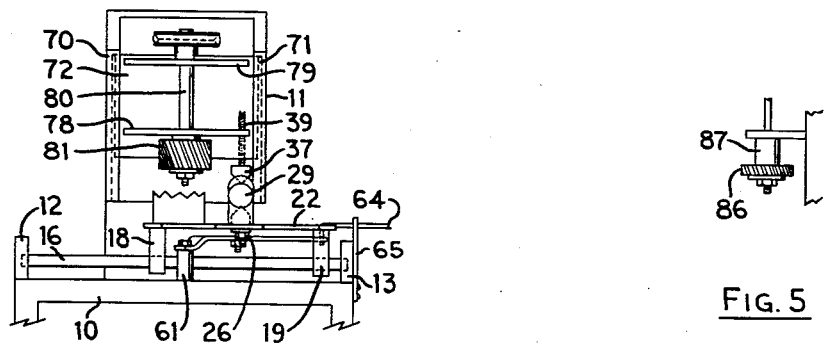
FIG. 2
FIG. 5
INVENTOR.
O.D. SCARBOROUGH
BY
*O. O'Brien*
*F. L. Styner*
ATTYS.

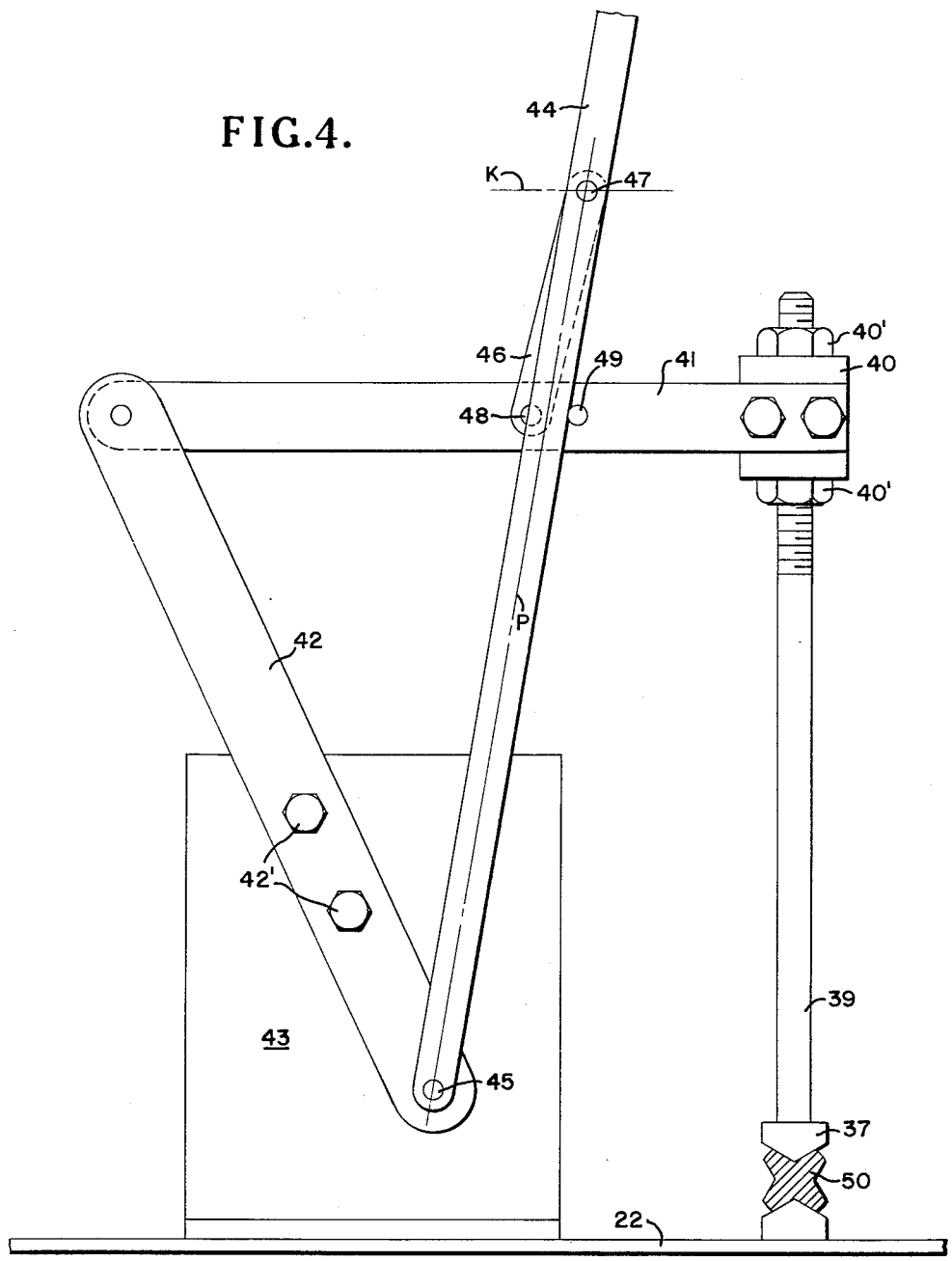

United States Patent Office 3,035,830
Patented May 22, 1962

3,035,830
MACHINE FOR MILLING AND REMOVING IN-
HIBITORS FROM PROPELLANT GRAIN
O. D. Scarborough, Hastings, Nebr., assignor to the
United States of America as represented by the Secretary of the Navy
Filed June 18, 1954, Ser. No. 437,897
2 Claims. (Cl. 269—201)
(Granted under Title 35, U.S. Code (1952), sec. 266)

The invention described herein may be manufactured and used by or for the Government of the United States of America for governmental purposes without the payment of any royalties thereon or therefor.

This invention relates to milling machines and more particularly to work holder means of a milling machine for milling off the plastic inhibitors from the ends of rocket propellant grains including the grain end slots in a squared relation to the longitudinal centerline of the grain. Since the grains are irregular in cross-section, they require special holding means on the machine, and since the grains are highly inflammable, they also require the milling operation to be carried out in a flameproof enclosure.

The solid propellant of a rocket is called a "grain." The grain is an elongated stick of extruded or cast mixture of plastic and gun powder. The cross-section of a grain is usually irregular and is often produced with longitudinal V-shaped grooves which provide a grain of cross-section in the form of a cross. The rate of burning of a grain, when ignited, is controlled by "inhibitors" fixed at spaced intervals along the grain, usually along the ribs between the longitudinal grooves. The inhibitors consist of pieces of hard clear plastic and are usually fixed to the grain as by cementing. Inhibitors are also cemented to each end of every grain to protect the ends while the grains are being stored. In order to insure that the end inhibitors stay on the grain, the end of the grain is slotted during production and the inhibitors are keyed in this slot. It is usual practice to make the end inhibitors about one-half inch thick although this thickness is a matter of choice. The inhibitors become hard and brittle with age necessitating their removal and the replacement of new ones periodically in order that storage of the grains may be continued. The problem in the past has been to remove the end inhibitors without removing any of the combustible grain material and without igniting the grain.

The old and only known method of removing the end inhibitors from propellant grains was both crude and dangerous. The old method consisted of using an ordinary bench saw for sawing the inhibitors off the grain and of using a chisel to clear the inhibitor from the end slot of the grain. The primary disadvantage of this old method was the ever present fire hazard. Other disadvantages were that the ends of the grain were seldom square and that this operation was slow.

In the present invention a milling machine is used which has a cutting tool rotatable on a vertical axis and adjustable along that axis and a work holding table slidable horizontally adjacent the cutting tool. The propellant grain is held in position on the work holding table in a 45 degree axial angular position by two or more pairs of V-jaws manually actuated by a toggle clamping means. The grain is held on the work holding table normal to the direction of horizontal slide in order that the end of the grain can be made to pass across the cutting tool at right angles to the longitudinal axis of the grain. The V-jaws are paired with the knife edges adjacent so that they will firmly hold the grain therebetween with each knife edge resting in the valley of opposite V-shaped grooves in the grain. The lower V-jaws rest on the work holding table and can be shimmed up and adjusted sidewise a limited amount in order to level and align the supported grain. The upper V-jaws are each adjustable to position it in spacial relation with respect to its companion fixed jaw. The upper V-jaws are supported on a toggle over-center clamping means so that the grains can be rapidly inserted and removed. The milling machine may be placed within an enclosure and controlled from the exterior of the enclosure where attendant personnel is safe from being burned. By the use of this milling machine one attendant can mill off the hardened end inhibitors rapidly and safely. It is therefore a general object of this invention to provide a milling machine for holding a propellant grain in an aligned manner to mill off the end inhibitors and to mill out the end slots of inhibitor material in squared relation to the longitudinal centerline of the grain.

These and other objects, advantages, features, and uses will become more apparent as the description proceeds when considered in view of the accompanying drawings, in which:

FIG. 1 is a side elevational view of the milling machine with a propellant grain clamped therein for the milling operation;

FIG. 2 is an end elevational view of the milling machine of FIG. 1 with the clamping means broken away to show structure;

FIG. 3 shows a top view illustrating the means to adjust the work holding table normal to the longitudinal centerline of the propellant grain;

FIG. 4 is a greatly enlarged partial elevational view of the over-center toggle clamping means with the V-jaws holding a propellant grain; and FIG. 5 shows a partial elevational view of the slot cutting tool.

Referring more particularly to FIGS. 1, 2, and 3, the milling machine is shown with a main frame 10 having an upright frame 11 thereon. On the main frame 10 are fixed four blocks 12, 13, 14, and 15, the two blocks 12 and 13 being in parallel relation across the top of the frame 10 to the two blocks 14 and 15. Two heavy rods 16 and 17 span the main frame 10 and have their ends supported in the blocks, the rod 16 being supported in blocks 12 and 13 and the rod 17 being supported in the blocks 14 and 15.

Slidably mounted on the rods 16 and 17 are blocks 18, 19, 20, and 21, arranged in pairs, the four slidable blocks being fixed to substantially the four corners of a work holder table or platform member 22. The work holder table 22 is of less width than the main frame 10 whereby the work holder table is slidable for a distance crosswise of the main frame 10 more than the outside dimension through the largest propellant grain. The work holder table 22 has an extension 23 thereon with an elongated slot 24 therein for adjustably holding, as by a bolt 26, a threaded support 27. Through the threaded support 27 is threaded a threaded screw 28 having a knurled knob 29 on the outer end thereof and a swivel end 30 on the inner end thereof for the purpose soon to be described.

Fixed to the top surface of the work holder table 22 in any suitable manner, as by bolting, are two V-shaped blocks or jaws 35 and 36 with their knife edges in alignment and in a line parallel and under the longitudinal centerline of the threaded screw 28. Obviously, more than two V-jaws may be provided to hold the propellant grain stable whenever such a provision is necessary or desirable. The V-jaws are used in pairs requiring a companion compression V-block or jaw for each V-jaw fixed to the work holder table top. The companion compression V-jaws are best seen in FIGS. 1 and 4 in which two compression V-jaws 37 and 38 are supported directly over the V-jaws 35 and 36, respectively. Since the toggle means for supporting and operating both compression V-jaws is the same, only one will be described using the V-jaw 37 as an example in FIG. 4. The V-jaw 37 is fixed on a threaded shaft 39 which is adjustably secured to block 40 by means of nuts 40'. The block 40 is fixed to the end of a lever 41 in any suitable manner as by welding, riveting, or bolting. The opposite end of lever 41 is pivoted on a member 42 which is fixed in position by any suitable means such as bolts 42' as by welding, riveting, or the like, to a bracket member 43 which is, in turn, rigidly secured to the work holder table top 22. A double handle member 44 is pivoted to 42 at 45 and also has a pair of links 46 pivoted to handle 44 at 47. The other ends of the links 46 are pivoted to substantially the central portion of the lever 41 at 48. In the position shown in FIGS. 1 and 4 the clamping means is set in its clamped position in which the handle 44 is pulled to its extreme clockwise position (see FIG. 4) in which the pivot point 48 is in slightly over-center position to the pivotal points 45 and 47. In the clamped position as shown in FIG. 4, handle 44 is prevented from executing further clockwise movement due to engagement with stop 49 which is rigidly secured to lever 41 and since the reactive force exerted by grain 50 attempts to move handle 44 in the clockwise direction, the grain is thereby securely held in position. To release grain 50, handle 44 must be pulled in the counterclockwise direction which causes pivot 47 to execute an upward arc, as does pivot 48, to thereby allow pivot 48 to pass through dead center position with respect to pivot points 45 and 47, thus raising lever 41 and releasing grain 50.

At this point, two important features should be noted. First, it should be noted that, since pivot point 47 executes an upward arc in moving from the clamped position shown in FIG. 4 to the released position, pivot 48 will pass through dead center position without substantially increasing the clamping force exerted on grain 50. That is, the upward motion of pivot 47 tends to compensate for the slight downward motion of lever 41 which would occur as pivot 48 approaches dead center if pivot 47 did not have an upward component of motion. The second feature is the fact that, since handle 44 is at an angle with respect to the vertical direction when in the clamped poistion, gravitational force acting on the mass of the entire system tends to pull the handle in the clockwise direction. This tendency, therefore, precludes the accidental release of the clamp due to shocks or vibrations occurring during the milling operation which, when dealing with propellant grains, might lead to disastrous results.

As illustrated in FIGS. 1 to 4, a propellant grain 50 is shown clamped in position on the work holder table, the endwise position being adjusted by the adjustable screw 28. The propellant grain 50 illustrated has a cross-sectional configuration of a cross and the V-jaws have their knife edges interfitting in the opposed V-channels of the propellantg rain. The degree of compression of the V-jaws can be adjusted by the threaded shaft 39 for different size grains.

Referring again to FIGS. 1, 2, and 3, the work holder table, as hereinbefore described, is slidable crosswise of the frame 10 on the bars 16 and 17. To control this movement of the work holder table, a lever 60 is pivoted to a post 61 fixed to the frame 10. An elongated opening or slot 62 is provided at the midportion of lever 60 and a bolt 63 is passed therethrough and secured to the work holder table 22. The free end of the lever 60 has a rod 64 pivoted thereto which rod passes through an opening in a supporting bracket 65 to the front of the milling machine providing a second class lever where the transverse position of the work holder table 22 can be controlled manually by the rod 64, the purpose of which will soon be described.

Referring more particularly to FIGS. 1 and 2, the upright frame 11 has a vertical slide rail 70 and 71 on each side thereof in which is slidable a base plate 72. The base plate 72 has a vertically threaded block 73 fixed thereto into which is threaded a threaded shaft 74 having a bevel gear 75 on the lower end thereof. In mesh with the bevel gear 75 is another bevel gear 76 fixed on a shaft extending outwardly through the upright frame 11 and terminating in a handle 77. By turning the handle 77 the base plate 72 can be positioned vertically in the slides 70 and 71. The base plate supports two laterally directed brackets 78 and 79, through which is vertically journaled a shaft 80. The lower end of the shaft 80 has a removable cutter 81 thereon. The upper end of the shaft 80 has a pulley 82 thereon belted to a pulley 83 on an electric motor 84. The motor 84 is also mounted on the base plate 72 so that the motor, shaft, and cutter are vertically adjustable in unison. The cutter is adjustable vertically until the cutter 81 can cut across the complete end face of the propellant grain 50. Since the work holder table 22 is adjustable tranversely on the rods 16 and 17 and the propellant grain is clamped in a position accurately normal to the rods 16 and 17, the end face of the propellant grain can be very accurately milled square. A sprinkler conduit 85 is suspended over the grain to extinguish it in the event it becomes ignited.

As more particularly illustrated in the partial view of FIG. 5, a cutter 86 is substituted for the cutter 81 to mill out the end slot of the propellant grain 50. A spacer 87 may be used in attaching a smaller cutter to the shaft 80.

The operation of the milling machine is believed to be apparent from the description although a brief description of operation will be presented herein for reference. With both handles 44 thrown back a propellant grain can be positioned on the V-jaws and clamped. Prior to clamping, the endwise adjustment of the grain may be made by the threaded screw 28 to provide for a predetermined depth of the end cut. In this manner the cutter 81 can be made to just cut the end inhibitor 50' from the grain. The grain is reversed end-for-end and the opposite end inhibitor removed. The inhibitor 50' is fed into the cutter by manual control of the actuating rod 64. The same operation is used to remove the inhibitor material from the end slots by replacing the cutter 81 with the cutter 86. Accurate cutting of the slot can be obtained through the use of the vertical adjustment of the cutter by the handle 77 and through the use of the threaded screw 28. In actual practice all like operations will be carried out for a plurality of propellant grains before setting the milling machine for the next operation. In this manner the removal of the end inhibitors of propellant grains is very rapid and the grains are ready for receiving new end inhibitors.

The milling machine is enclosed (not shown) in use and only the control rod 64 and handle 77 extend through the wall of the enclosure. The enclosure should have a glass window therein so that the attendant can perform the milling operation safely. If a propellant grain is ignited, the sprinkler 85 may be turned on to extinguish it.

While many modifications and changes may be made in the constructional details and features of the milling machine and particularly the clamping means without departing from the spirit and scope of the invention, I desire to be limited only by the scope of the appended claims.

I claim:
1. A clamping device for releasably securing a work piece in a fixed position comprising; a platform member having one surface which provides support for the work piece, a bracket member rigidly secured to said platform member and projecting outwardly from said surface, a first lever having one end pivotally connected to said bracket member and extending in a direction which forms an acute angle with said surface, a second lever pivotally connected at one end to said bracket member and extending in a direction substantially parallel to said surface, said first and second levers being of sufficient length so as to intersect each other intermediate of their ends, a link member pivotally connected at one end to said first lever and pivotally connected at the other end to said second lever, clamping means connected to the other end of said second lever for cooperation with said surface to hold the work piece when the clamping device is in locked position, stop means rigidly secured to said second lever for engagement by said first lever, said pivotal connections being positioned such that the pivotal connection between said link and said second lever passes through dead center position with respect to the pivotal connections on said first lever immediately prior to engagement of said stop means by said first lever.

2. The clamping device as claimed in claim 1 in combination with work piece holding means, said means including a frame portion upon which said platform member is slideably mounted, said slideable mounting being provided by low friction means interposed between said frame and said platform member, and a second class lever system for moving said platform relative to said frame, said lever system including a platform moving lever having one end thereof pivotally connected to said frame portion, lever actuating means connected to the opposite end of said platform moving lever, said platform member being pivotally connected to said platform moving lever intermediate of said ends, whereby pivotal movement of said platform moving lever about said last named pivotal connection produces linear movement of said platform member relative to said frame portion.

References Cited in the file of this patent

UNITED STATES PATENTS

| | | |
|---|---|---|
| 1,978,360 | Archea | Oct. 23, 1934 |
| 2,021,243 | Rutter | Nov. 19, 1935 |
| 2,054,572 | McKenna | Sept. 15, 1936 |
| 2,142,439 | Forward | Jan. 3, 1939 |
| 2,242,487 | Swanson | May 20, 1941 |
| 2,305,900 | Roberts | Dec. 22, 1942 |
| 2,390,022 | Wood | Nov. 27, 1945 |
| 2,457,453 | Dunn | Dec. 28, 1948 |
| 2,464,117 | Coates | Mar. 8, 1949 |
| 2,464,297 | Ertl | Mar. 15, 1949 |
| 2,520,868 | Whiting | Aug. 29, 1950 |
| 2,543,917 | Lloyd | Mar. 6, 1951 |
| 2,547,807 | Bryant | Apr. 3, 1951 |

FOREIGN PATENTS

| | | |
|---|---|---|
| 701,417 | Great Britain | Dec. 23, 1953 |